Patented Feb. 26, 1946

2,395,506

UNITED STATES PATENT OFFICE 2,395,506

VULCANIZATION OF SYNTHETIC RUBBER

Doran E. Sauser, Cuyahoga Falls, Ohio, assignor to The B. F. Goodrich Company, New York, N. Y., a corporation of New York No Drawing. Application May 15, 1943, Serial No. 487,153

9 Claims. (Cl. 260—84.5)

This invention relates to the vulcanization or curing of synthetic rubber of the type which may be defined as rubbery copolymers of butadiene-1,3 hydrocarbons with copolymerizable mono-olefinic compounds, and particularly to a method of vulcanizing such rubbery copolymers without the use of sulfur and other conventional sulfur-containing vulcanizing agents.

The vulcanization or curing, i. e., the conversion from an essentially plastic condition to an essentially elastic, non-plastic condition, of rubbery copolymers of butadiene-1,3 hydrocarbons and copolymerizable mono-olefinic compounds has heretofore been effected by heating the copolymer with about 1 to 10% of sulfur in much the same manner that natural crude rubber is vulcanized. Furthermore, it has heretofore been believed that the presence of sulfur or some other conventional sulfur-containing vulcanizing agent such as sulfur mono-chloride, sulfur dithiocyanate, tetra-alkyl thiuram disulfides or the like was absolutely necessary for the vulcanization of this type of synthetic rubber.

I have now discovered, quite surprisingly, that rubbery copolymers of butadiene-1,3 hydrocarbons and copolymerizable mono-olefinic compounds may be vulcanized in the absence of sulfur and other conventional vulcanizing agents by heating the copolymer with a metal oxide or a mixture of metal oxides; and that the vulcanizates so obtained are remarkably superior in a number of respects to the conventional sulfur vulcanizates.

Although vulcanization occurs when the synthetic rubber is heated with any of the metal oxides, including the alkaline earth metal oxides, heavy metal oxides and even the alkali metal oxides, it has been found preferable to employ an oxide of a bivalent metal (a metal exhibiting a valence of two in some if not all of its compounds) such as those of zinc, cadmium, mercury, magnesium, lead, tin, calcium, barium, strontium, vanadium, manganese, iron, cobalt, nickel and the like or mixtures of these. Oxides of metals of group II of the periodic table and litharge (PbO), and particularly mixtures of these oxides such as mixtures of litharge with group II metal oxides and mixtures of ZnO with other group II metal oxides have been found to yield the most desirable vulcanizates.

The amount of the metal oxide or mixture of metal oxides admixed with the synthetic rubber may be varied widely but in general it is preferred to employ from about 5 to 30 parts by weight of the oxide for each 100 parts by weight of the synthetic rubber. Amounts as small as 1 part of the oxide, however, have been found to yield desirable vulcanizates. When mixtures of oxides are employed, best results are obtained when each of the metal oxides used is present to an extent of at least 5 parts per 100 parts of the synthetic rubber and the total amount of oxides used is about 10 to 40 parts per 100 parts of the synthetic rubber. Obviously the total amount of the oxides used will not in any case be so large as to destroy the rubbery character of the composition.

Various other substances, excepting sulfur and sulfur-containing vulcanizing agents, which are customarily used in the compounding of natural and synthetic rubber may also be included in the synthetic rubber, metal oxide compositions before vulcanization. Thus, reinforcing pigments and fillers such as the various carbon blacks, whiting and the like; softeners and plasticizers such as dibutyl phthalate, coal tar cumar resins and the like; antioxidants such as phenyl beta naphthylamine; and various other conventional compounding ingredients may be added to the compositions if desired. The well-known accelerators of vulcanization, as distinguished from vulcanizing agents, such as the thiazoles, thiazolines, dithiocarbamates, guanidines and thiazyl disulfides may also be present but they are not preferred since their accelerating effect is not nearly so pronounced as when used in connection with sulfur. Other rubbery materials such as natural rubber, reclaimed natural rubber, neoprene and plasticized polyvinyl chloride may also be included in the compositions to be vulcanized. The nature and amounts of all these added ingredients will obviously depend primarily upon the properties desired in the vulcanizate and may be regulated in the manner well known to the art.

The vulcanization of the rubbery copolymer compositions may be carried out in any desired manner as by heating in a mold, in open steam and in hot air. The time and temperature of heating may be substantially the same as that employed in the conventional vulcanization of rubbery materials with sulfur, and are not critical. Temperatures somewhat higher than ordinarily used in sulfur vulcanization such as from about 290 to 350° F., and vulcanization times of from 10 to 120 minutes have been found to be particularly advantageous. Best results are usually obtained when the vulcanization is carried out by heating the copolymer composition in the substantial absence of air as by heating in a mold or press.

The metal oxides herein described may be used not only in the vulcanization of solid compositions but also in the vulcanization of latices or cements of rubbery copolymers of butadiene-1,3 hydrocarbons and mono-olefinic compounds, without the necessity of employing sulfur and sulfur-containing vulcanizing agents.

Any of the rubbery copolymers of one or more butadiene-1,3 hydrocarbons, such as butadiene-1,3, isoprene, 2,3-dimethyl butadiene-1,3, piperylene and the like, with one or more copolymerizable mono-olefinic compounds may be vulcanized by the method of this invention. Examples of copolymerizable mono-olefinic compounds (compounds which contain a single olefinic double bond

and which are copolymerizable with butadiene-1,3 hydrocarbons) include styrene, p-methyl styrene, alpha-methyl styrene, p-chlorostyrene, vinyl naphthalene and similar aryl olefins and substituted aryl olefins; isobutylene and similar copolymerizable olefinic hydrocarbons; acrylic and substituted acrylic acids and their esters, nitriles and amides such as acrylic acid, acrylonitrile, methacrylonitrile, alpha-chloro acrylonitrile, methyl acrylate, methyl methacrylate, ethyl methacrylate, methyl alpha-chloro acrylate, acrylamide, methacrylamide and the like; vinyl methyl ketone, vinyl methyl ether, vinylidene chloride and similar copolymerizable compounds containing a single olefinic double bond. Although rubbery copolymers prepared by the copolymerization by any desired method of butadiene-1,3 hydrocarbon and a copolymerizable mono-olefinic compound in any desired proportions (providing a rubbery material is the product) may be used, the rubbery copolymers which are most readily available and are ordinarily employed in this invention are those prepared by the copolymerization in aqueous emulsion of butadiene-1,3 with a lesser amount of styrene, acrylonitrile, isobutylene or an acrylic ester.

The methods of practicing the invention and the results obtained thereby may further be illustrated by the following specific examples, but it is not intended that the invention be limited thereto.

*Example I*

100 parts of a plastic rubbery copolymer of butadiene-1,3 and acrylonitrile (prepared by the copolymerization in aqueous emulsion of 55 parts by weight of butadiene-1,3 and 45 parts by weight of acrylonitrile) are mixed with 25 parts of litharge and the resulting composition is heated in a mold for 20 minutes at 310° F. Upon removing the copolymer from the mold it is found to be essentially non-plastic but elastic and snappy in properties, that is, it is found to be vulcanized. The vulcanizate possesses a tensile strength of 2,000 lbs./sq. in., an ultimate elongation of 740% and an especially high heat resistance being superior in all these respects to "pure gum" sulfur vulcanizates. It may be used in a number of applications as in the production of thread, bands, tank linings and other applications where "pure gum" compounds, i. e., rubbery compositions containing no fillers, reinforcing pigments or softeners or only small amounts thereof, are ordinarily used.

Other excellent "pure gum" vulcanizates may be prepared from the synthetic rubber used above or from other synthetic rubbers such as the rubbery copolymer of butadiene-1,3 and styrene by vulcanizing the rubber with 1 to 25 parts of other metallic oxides. For example, excellent vulcanizates are obtained by substituting 5 parts of zinc oxide, magnesium oxide, cadmium oxide or barium oxide or two parts of $PbO_2$ for the litharge of the above example. All these vulcanizates are superior in physical properties to pure gum sulfur vulcanizates. They are also free of localized reddish-brown spots commonly observed with pure gum sulfur vulcanizates and are better suited for use in contact with metals since the sulfur vulcanizates often corrode the surface of the metal by the formation of metallic sulfides.

*Example II*

A composition suitable for use in the manufacture of molded articles required to have high strength and resistance to hydrocarbon fuels is prepared by vulcanizing at 292° F. for 120 minutes a composition containing the following ingredients:

| | Parts |
|---|---|
| Butadiene-1,3 acrylonitrile copolymer (prepared by copolymerizing 55 parts of butadiene-1,3 and 45 parts of acrylonitrile) | 100 |
| Zinc oxide | 10 |
| Litharge | 20 |
| Gastex (a soft carbon black) | 30 |

The vulcanizate so obtained possesses a tensile strength of 2880 lbs./sq. in., an elongation of 710% and a Durometer hardness of 65. It is superior in heat resistance, oil resistance and tear resistance to similarly loaded stocks vulcanized with sulfur and a conventional vulcanization accelerator.

*Example III*

A composition is prepared as follows:

| | Parts |
|---|---|
| Butadiene-1,3 acrylonitrile copolymer (55:45 emulsion copolymer) | 100 |
| Litharge | 10 |
| Zinc oxide | 5 |
| Stearic acid | 1 |
| Channel black | 75 |
| Dibutyl phthalate | 10 |
| Coumarone-indene resin | 10 |

This composition is heated in a mold for 30 minutes at 320° F. An excellent heat resistant vulcanizate which may be used in the manufacture of tires or in the production of oil-resistant molded articles is obtained. The vulcanizate possesses a tensile strength of 2800 lbs./sq. in., a 950% elongation and is remarkably superior in oil resistance and tear resistance to similar vulcanizates prepared by vulcanization with sulfur.

*Example IV*

A rubbery butadiene-1,3 styrene copolymer prepared by copolymerizing in aqueous emulsion 70 parts of butadiene-1,3 and 30 parts of styrene is compounded in the following recipe:

| | Parts |
|---|---|
| Butadiene-1,3 styrene copolymer | 100 |
| Zinc oxide | 10 |
| Soft coal tar | 10 |
| Carbon black | 25 |
| Wool grease | 2 |

The composition is then vulcanized for 40 minutes at 275° F. A vulcanizate having good physical properties and excellent tear and heat resistance is obtained.

Example V

A composition containing the following ingredients is vulcanized by heating at 320° F. for 60 minutes.

| | Parts |
|---|---|
| Butadiene-1,3 acrylonitrile copolymer | 100 |
| Zinc oxide | 10 |
| Magnesium oxide | 10 |
| Dibutyl phthalate | 30 |
| Carbon black | 90 |

The vulcanizate obtained possesses excellent physical properties and over 400% greater tear resistance than a similar vulcanizate prepared by heating with sulfur and accelerator. Similar vulcanizates are obtained when 10 parts of cadmium oxide, lead oxide, and calcium oxide as well as other group II metal oxides are substituted for the magnesium oxide in the above example.

The above examples show that excellent vulcanizates which are superior to conventional sulfur-vulcanizates may be obtained by vulcanizing rubbery copolymers of butadiene-1,3 hydrocarbons and copolymerizable mono-olefinic compounds in the presence of metallic oxides and in the absence of sulfur and conventional sulfur-containing vulcanizing agents. The examples also show that outstanding improvements in heat resistance, oil resistance and tear resistance are produced by the use of mixtures of metallic oxides as the sole vulcanizing agents. These same outstanding results are also obtained when various modifications and variations in the type of synthetic rubber used and in the nature and proportion of substance admixed therewith are effected; hence such variations and modifications are within the spirit and scope of the invention as defined by the appended claims.

I claim:

1. The method of vulcanizing a rubbery copolymer of a butadiene-1,3 hydrocarbon and an unsaturated compound containing a single olefinic double bond, which comprises heating said copolymer in the presence of a mixture of litharge and an oxide of a metal occurring in group II of the periodic table and in the absence of sulfur and other sulfur-containing vulcanizing agents.

2. The method of vulcanizing a rubbery copolymer of a butadiene-1,3 hydrocarbon and an unsaturated compound containing a single olefinic double bond, which comprises heating said copolymer in the presence of a mixture of zinc oxide and litharge and in the absence of sulfur and other sulfur-containing vulcanizing agents.

3. The method of vulcanizing a rubbery copolymer of butadiene-1,3 and acrylonitrile which comprises heating said copolymer in the presence of a mixture of litharge and an oxide of a metal occurring in group II of the periodic table and in the absence of sulfur and other sulfur-containing vulcanizing agents.

4. The method of vulcanizing a rubbery copolymer of butadiene-1,3 and acrylonitrile which comprises heating said copolymer in the presence of a mixture of litharge and zinc oxide and in the absence of sulfur and other sulfur-containing vulcanizing agents.

5. The method of vulcanizing a rubbery copolymer of butadiene-1,3 and styrene which comprises heating said copolymer in the presence of a mixture of litharge and zinc oxide and in the absence of sulfur and other sulfur-containing vulcanizing agents.

6. A vulcanizate prepared by the method of claim 1.

7. A vulcanizate prepared by the method of claim 2.

8. A vulcanizate prepared by the method of claim 4.

9. A vulcanizate prepared by the method of claim 5.

DORAN E. SAUSER.